C. C. DUSENBURY.
Device for Dividing Glass.

No. 223,439.  Patented Jan. 13, 1880.

Witnesses:
Henry Eichling
H Wells Jr

Inventor:
C. Cola Dusenbury
per James A Whitney
Atty

UNITED STATES PATENT OFFICE.

C. COLES DUSENBURY, OF NEW YORK, N. Y.

DEVICE FOR DIVIDING GLASS.

SPECIFICATION forming part of Letters Patent No. 223,439, dated January 13, 1880.

Application filed August 21, 1879.

*To all whom it may concern:*

Be it known that I, C. COLES DUSENBURY, of the city, county, and State of New York, have invented certain Improvements in Devices for Dividing Glass, of which the following is a specification.

This invention is based upon the fact that if a plate of glass be nicked or notched at the edge and the acute corner of a heated piece of metal be drawn from said nick along the surface of the glass the sudden expansion of the glass from the heat will cause it to fracture along the track of the heated metal.

The invention comprises the combination of a heat-retaining knob with a metallic tool having a suitable corner or edge, whereby the heat drawn from the said corner or edge, in traversing the glass, is caused to be replaced by that transmitted from the aforesaid knob, which thus acts as a reservoir of heat to the tool.

The invention further comprises certain novel combinations of parts whereby the tool is fitted for forming the preliminary nick and is otherwise mechanically manipulating the glass without changing from one implement to another.

Figure 1:
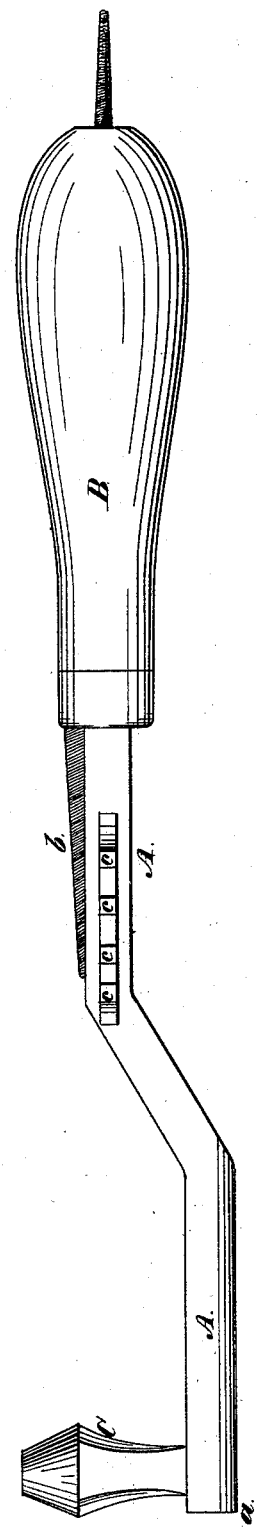
Figure 2:
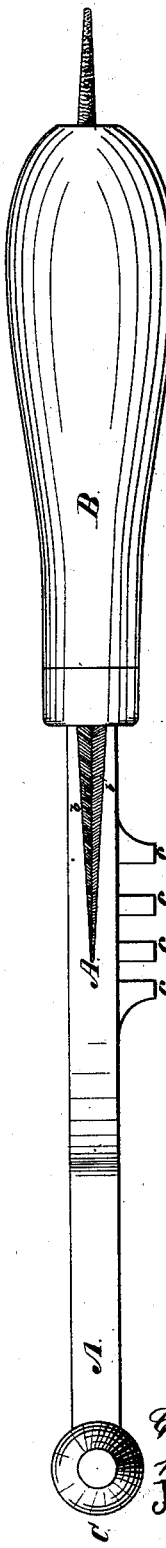

Figure 1 is a side, and Fig. 2 a top, view of a device embracing my said invention.

A is the glass-dividing tool, made of iron or other suitable metal, and having at one end the corner or edge $a$ more or less sharp or acute. It is this corner or edge that, when heated, is drawn along the surface of the glass in the line—straight, curved, or irregular, as the case may be—in which it is desired to divide or fracture the glass. Upon the opposite end of the tool A is a handle, B. Provided upon the tool A, preferably in one piece therewith, and upon the same end as the corner or edge $a$, is the knob C, which serves as the heat-reservoir of the tool.

In order to use the apparatus for dividing the glass, the knob C is heated to any requisite degree, (a greater heat is required for thick glass plates than for those comparatively thin, and in any case the degree of heat may vary within wide limits,) and from its proximity to the corner or edge $a$ heats the same to nearly or quite the same temperature. When the device is used, as hereinbefore explained, the heat would be rapidly withdrawn from the corner or edge $a$, and the operation thereof be made to cease, were it not that the heat stored up in the knob C is continually transmitted to the said corner or edge, and keeps the same sufficiently hot to insure its dividing or fracturing action upon the glass until the heat of the said knob is practically exhausted.

In order that the implement may be used for making the preliminary nick or notch in the edge of the glass, there is affixed parallel with the tool A a small three-cornered file, $b$, as shown in Fig. 1. In order, moreover, that strips fractured from a plate of glass, but more or less adherent thereto along the line of fracture, may be readily detached, a system of claws, $c$, are provided on the shank of the tool A, as more clearly represented in Fig. 2; and in order, furthermore, that the different parts of the divided glass may, when more or less adherent along the line of fracture, be readily tapped to jar them apart, the knob C itself is made more or less of the form of a hammer, and is capable, for the purpose just indicated, of being used as such.

What I claim as my invention is—

1. The combination of the knob or heat-reservoir C with the tool A, having the corner or edge $a$, substantially as and for the purpose set forth.

2. The combination of the file $b$ with the shank and handle of the tool A, constructed with the corner or edge $a$, and the knob or heat-reservoir C, substantially as and for the purpose set forth.

3. The combination of the tool A, having the hammer-shaped knob or heat-reservoir C, the corner or edge $a$, and handle B, with the file $b$ and claws $c$, all substantially as and for the purpose set forth.

C. COLES DUSENBURY.

Witnesses:
 H. W. ELLS, Jr.,
 HENRY EICHLING.